United States Patent
Takada et al.

(10) Patent No.: US 8,341,824 B2
(45) Date of Patent: Jan. 1, 2013

(54) METHOD FOR MANUFACTURING CIRCUMFERENTIALLY DEPLOYING TYPE OF STATOR COIL

(75) Inventors: Masahiro Takada, Okazaki (JP); Akito Akimoto, Kariya (JP); Hideji Shimaoka, Anjo (JP)

(73) Assignee: DENSO CORPORATION, Kariya (JP)

( * ) Notice: Subject to any disclaimer, the term of this patent is extended or adjusted under 35 U.S.C. 154(b) by 475 days.

(21) Appl. No.: 12/370,880

(22) Filed: Feb. 13, 2009

(65) Prior Publication Data

US 2009/0199393 A1    Aug. 13, 2009

(30) Foreign Application Priority Data

Feb. 13, 2008   (JP) .................................. 2008-031995

(51) Int. Cl.
*H02K 15/00* (2006.01)
*H01F 7/06* (2006.01)
*B23P 19/00* (2006.01)

(52) U.S. Cl. ................. 29/596; 29/605; 29/732

(58) Field of Classification Search .................... 29/596, 29/605, 606, 732; 72/295, 481.5; 310/179, 310/184, 198, 201, 206, 208
See application file for complete search history.

(56) References Cited

U.S. PATENT DOCUMENTS

| | | | | |
|---|---|---|---|---|
| 6,376,961 B2* | 4/2002 | Murakami et al. | ............ | 310/184 |
| 6,806,611 B2* | 10/2004 | Bharaj et al. | .................. | 310/208 |
| 6,888,281 B2* | 5/2005 | Koike et al. | .................... | 310/179 |
| 6,951,054 B2* | 10/2005 | Hirota et al. | ..................... | 29/596 |
| 7,026,735 B2* | 4/2006 | Akita et al. | ..................... | 310/71 |
| 7,155,319 B2* | 12/2006 | Nangoy et al. | ................ | 700/281 |
| 7,360,303 B2* | 4/2008 | Hirota et al. | .................... | 29/606 |
| 7,624,493 B2* | 12/2009 | Hirota et al. | ................. | 29/564.1 |

(Continued)

FOREIGN PATENT DOCUMENTS

JP   06-284651   10/1994

(Continued)

OTHER PUBLICATIONS

Japanese Office Action dated Jan. 19, 2010, issued in corresponding Japanese Application No. 2008-031995, with English translation.

*Primary Examiner* — David Angwin
(74) *Attorney, Agent, or Firm* — Nixon & Vanderhye PC

(57) ABSTRACT

A method of manufacturing a stator coil to be wound in and around a stator by bending an insulating-coating conducting wire so as to alternately have slot-held conductor sections to be held in slots of the stator and a coil-end conductor sections each mutually connecting two of the slot-held conductor sections outside the slots. The method includes arranging three or more pairs of molds at predetermined intervals along the insulating-coating conducting wire, each pair of molds having paired molds facing each other with the wire located therebetween. First, the coil-end conductor sections are formed by moving the mold pairs such that the paired molds come closer to each other. Then the slot-held conductor sections are formed by moving the molds, in parallel, in both the longitudinal direction along which the insulating-coating conducting wire extends and in a direction perpendicular to the longitudinal direction.

13 Claims, 8 Drawing Sheets

U.S. PATENT DOCUMENTS

| | | | |
|---|---|---|---|
| 7,624,768 B2 * | 12/2009 | Neet et al. | 140/92.1 |
| 7,647,689 B2 * | 1/2010 | Nishimura et al. | 29/596 |
| 7,679,253 B2 * | 3/2010 | Neet | 310/208 |
| 7,770,286 B2 * | 8/2010 | Hirota et al. | 29/605 |
| 7,856,701 B2 * | 12/2010 | Hirota et al. | 29/596 |
| 7,891,082 B2 * | 2/2011 | Akimoto | 29/606 |
| 7,994,677 B2 * | 8/2011 | Kouda et al. | 310/201 |
| 8,056,215 B2 * | 11/2011 | Takada et al. | 29/605 |
| 8,082,653 B2 * | 12/2011 | Akimoto et al. | 29/596 |
| 8,122,593 B2 * | 2/2012 | Gorohata et al. | 29/729 |
| 2002/0050395 A1 * | 5/2002 | Kusumoto et al. | 174/128.2 |

FOREIGN PATENT DOCUMENTS

| | | |
|---|---|---|
| JP | 2002-027693 | 1/2002 |
| JP | 2002-176752 | 6/2002 |
| JP | 3894483 | 12/2006 |
| JP | 2007-288848 | 11/2007 |

* cited by examiner

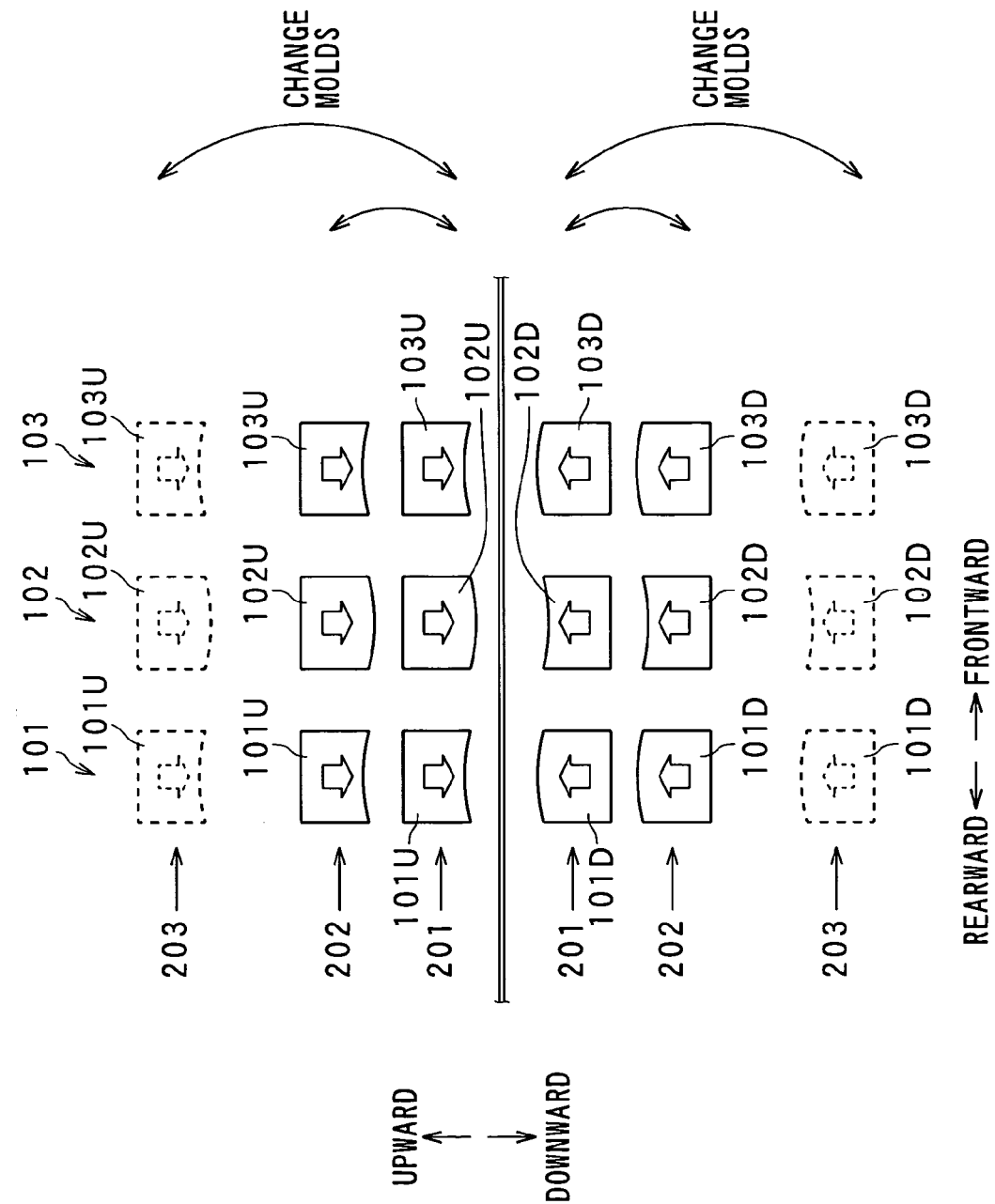

US 8,341,824 B2

METHOD FOR MANUFACTURING CIRCUMFERENTIALLY DEPLOYING TYPE OF STATOR COIL

CROSS-REFERENCE TO RELATED APPLICATION

This application is based on and claims the benefit of priority from earlier Japanese Patent Application No. 2008-031995 filed Feb. 13, 2008, the description of which is incorporated herein by reference.

BACKGROUND OF THE INVENTION

1. Technical Field of the Invention

The present invention relates to a method for manufacturing a circumferentially deploying type of stator coil and a motor using the stator coil.

2. Related Art

Recently, electric rotary machines have stator provided with stator coil assemblies called "circumferentially deploying type of stator coils." As an example of this, Japanese Patent No. 3894483 discloses a method for providing a stator coil assembly by using a circumferentially deploying type of stator coil. This type of stator coil includes alternation of coil-end conductor sections and conductor sections to be held in the slots (hereinafter referred to "slot-held conductor section(s)"), which are linearly expanded. The linearly expanded stator coil is inserted into each of the slots of the stator core to provide an assembly of a stator coil, which forms the stator.

However, the method for manufacturing the circumferentially stator type of stator coil described in the above reference is complicated, and changing the axial and radial lengths of the stator coil has not been easy.

SUMMARY OF THE INVENTION

The present invention has been made in light of the problems mentioned above, and has as its object to provide a method for manufacturing a circumferentially deploying type of stator coil that can easily cope with the change of motor models, using a simple manufacturing apparatus, and to provide a motor using the stator coil.

In order to achieve the above object, as one aspect of the present invention, there is provided a method of manufacturing a stator coil to be wound in and around a stator by bending an insulating-coating conducting wire (i.e., insulated conducting wire) having a longitudinal direction so as to alternately provide the insulating-coating conducting wire with slot-held conductor sections held in slots of the stator and a coil-end conductor section mutually connecting the slot-held conductor sections outside the slots, the stator having a circumferential direction along which the coil-end conductor section is deployed and an axial direction along which the slots are formed.

The "slot-held conductor section" here refers to a section of a stator coil, which is held in a slot of a stator corer the section being linearly extended in the axial direction. Also, the "coil-end conductor sections" here refer to a section of a stator coil, which is provided along an axial end face of the stator core, while being deployed in the circumferential direction, to join two slot-held conductor sections which are distanced from each other by an electrical angle of about π pitch.

Practically the method comprises: locating three or more pairs of molds along a portion of the insulating-coating conducting wire in the longitudinal direction at predetermined intervals, the portion of the coil-end conductor section being formed into the coil-end conductor section, each pair of molds having paired molds facing with each other with the portion therebetween; and forming i) the coil-end conductor section by moving the three or more pairs of molds along a direction allowing, of each of the three or more pairs of molds, paired molds to come closer to each other and ii) the slot-held conductor sections by moving the three or more pairs of molds, in parallel, in both a direction perpendicular to the longitudinal direction of the insulating-coating conducting wire and the longitudinal direction thereof.

Specifically, a pair of molds (hereinafter referred to as a "mold pair") clamping the insulating-coating conducting wire is moved in the direction to which the insulating-coating conducting wire is extended, while being concurrently moved in the direction perpendicular thereto, to thereby form the slot-held conductor section.

Thus, the slot-held conductor section can be efficiently formed. In addition, the insulating-coating conducting wire is unlikely to be slidably moved relative to the mold pair, in forming the slot-held conductor section with the movement of the mold pair. Therefore, damage that would be caused on the insulating-coating conducting wire can be reduced.

It is preferred that the three or more pairs of molds are composed of three pairs of molds including a middle pair of molds positioned between the two pairs of molds and the forming step forms the slot-held conductor sections by making, of the three pairs of molds, specified two pairs of molds move toward the remaining one pair of molds and the middle pair of molds move along the direction perpendicular to the longitudinal direction.

Thus, the two mold pairs will be unidirectionally moved to thereby prevent the insulating-coating conducting wire from moving in the opposite direction, whereby the actuation structure of a coil bending apparatus for forming the stator coil will be simplified.

It is also preferred that the forming step moves the three or more pairs of molds, in parallel, in both the direction perpendicular to the longitudinal direction and the longitudinal direction in a condition where, when forming the coil-end conduction section, mutually adjacent pairs of molds among the three or more pairs of molds are kept apart by a distance that corresponds to a length of the slot-held conductor sections in the axial direction, the distance corresponding to the intervals.

Thus, no bending stress will be applied to the slot-held conductor section, in forming the slot-held conductor section by bending the insulating-coating conducting wire in the direction perpendicular to the coil-end conductor section. Therefore, no re-bending operation will be necessary thereafter. In addition, the insulating-coating conducting wire can be prevented from being damaged, in particular, by the edge of a mold.

Preferably, the forming step moves the three or more pairs in both the direction perpendicular to the longitudinal direction and the longitudinal direction, respectively, by distances which are adjustable.

Thus, the length can be easily changed in the slot-held conductor section of the stator coil.

It is also preferred that the three or more pairs of molds includes a pair of molds selected from a plurality of pairs of molds respectively having different pressing surfaces to be pressed onto the portion of the insulating-coating conducting wire so as to form coil-end conductor sections having different shapes from each other.

Thus, only the change of molds can facilitate the manufacture of the stator coil with various coil end shapes.

It is still preferred that the forming step uses the three or more pairs of molds including a pair of molds selected from a plurality of pairs of molds respectively having different widths in the longitudinal direction when being arranged along the portion of the insulating-coating conducting wire, whereby the coil-end conductor section is given a changed width in the circumferential direction.

Thus, only the change of molds can easily differentiate the circumferential widths of the coil-end conductor sections.

In the above structure, by way of example, the plurality of pairs of molds respectively having the different widths, from which the pair of molds is selected, are arranged in a direction substantially perpendicular to an extending direction of the insulating-coating conducting wire and, in the forming step, the pair of molds is selected by relatively moving the plurality of pairs of molds having the different widths in an arranged direction thereof.

Thus, the molds can be easily changed by only moving a plurality of mold pairs located, say, perpendicular to the direction of extending the insulating-coating conducting wire, relative to the direction in which the mold pairs are located. Therefore, the circumferential widths of the coil-end conductor sections can be easily differentiated.

BRIEF DESCRIPTION OF THE DRAWINGS

In the accompanying drawings:

FIG. 12 is a schematic front elevational view illustrating the change of a circumferential width of a coil-end conductor section by using a mold pair selected from three mold pairs, according to a fourth embodiment of the present invention.

DETAILED DESCRIPTION OF THE PREFERRED EMBODIMENTS

With reference to the accompanying, drawings, hereinafter are so described some preferred embodiments of the present invention, for forming a stepped coil-end conductor section in a coil conductor that structures a stator coil. It should be appreciated that the present invention should not be construed as being limited to the following embodiments, but, as a matter of course, the technical concept of the present invention may be realized by combining other known techniques therewith.

Figure 1:
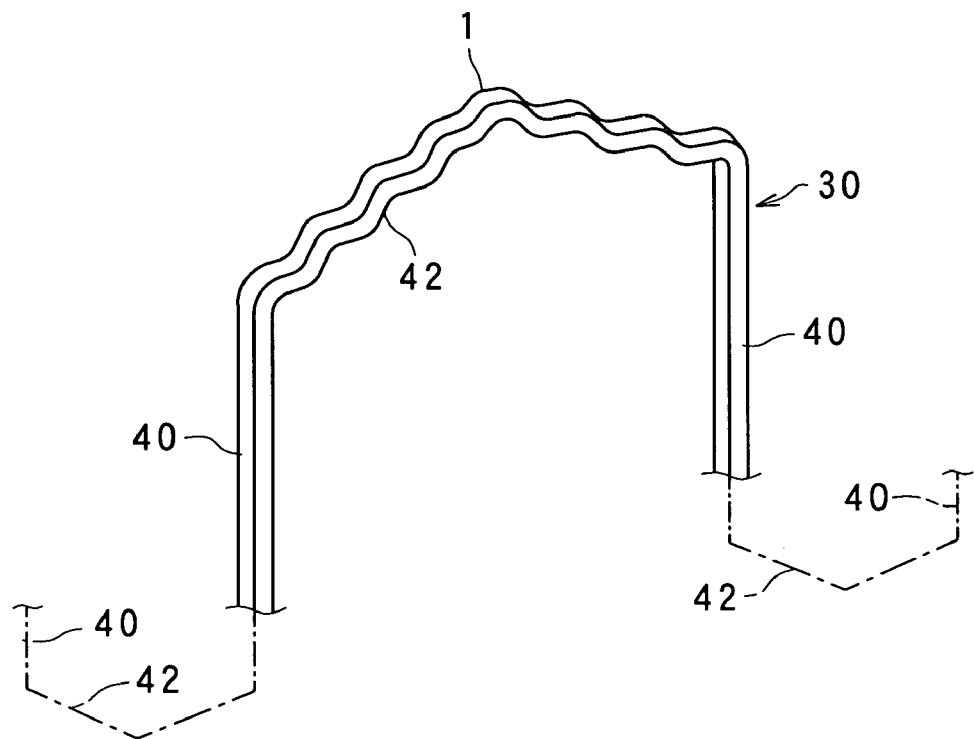
FIG. 1 is a partial perspective view illustrating one insulating-coating flat wire having stepped coil-end conductor sections, which is applied to a first embodiment of the present invention.
Figure 2:
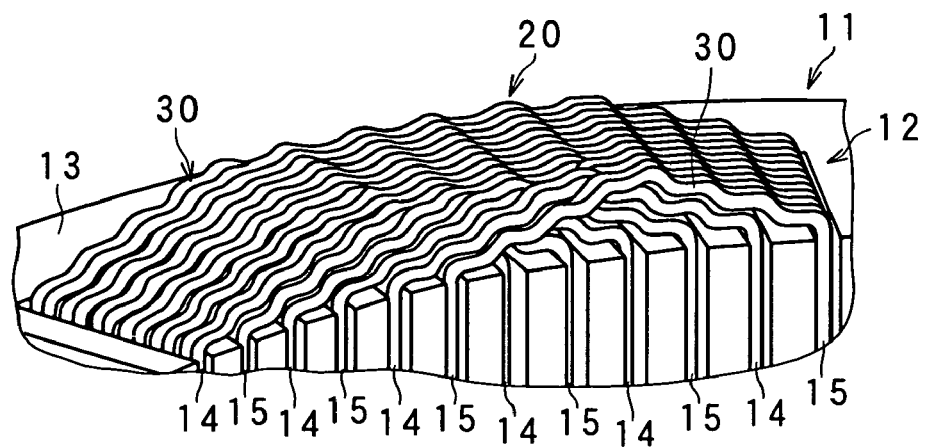
FIG. 2 is a partial perspective view illustrating the shape of a cranked coil end of a rotary electric machine, to which the present invention is applied.

Referring to FIGS. 1 to 4, hereinafter is described an embodiment of a stator coil made up of a coil conductor having coil-end conductor sections which are each formed into a stepped shape (hereinafter, this stator coil may also be referred to as a "cranked stator coil"). FIG. 1 is a partial perspective view illustrating an insulating-coating flat wire 30 (hereinafter also referred to as "flat wire 30") forming one coil conductor of the cranked stator coil FIG. 2 is a partial perspective view illustrating a cranked coil end of a stator of a rotary electric machine, such as motor and alternator, in which the stator is confronted with a rotor to have magnetic actions therewith. The coil end is an aggregate of stepped coil-end conductor sections 42.

FIG. 2 illustrates a stator 11, a stator core 12, an end face 13 of the stator core 12 and a stator coil 20. The stator 11 is used for a generator motor that activates a vehicle. Although not shown, a rotor is radially accommodated in the interior of the stator 11 in a rotatable manner. The rotor has an outer peripheral portion which is provided with a number of permanent magnets that form magnetic poles whose polarity is alternately differentiated in the circumferential direction. The outer peripheral surface of the rotor faces the inner peripheral surface of the stator 11 through a very small air gap. The stator core 12 is formed by axially laminating electromagnetic steel plates each of which has a predetermined thickness. The stator coil 20 is configured by three-phase windings in which a wave winding of one phase is provided in a slot 14 and a wave winding of the same phase is provided in a slot 15. In other words, a structure of so called two slots per every pole and every phase is provided, in which the stator coil 20 of the same phase is wound about two slots 14, 15 which are adjacent to each other.

The stator coil 20 has star-connected three-phase windings each of which is a distributed winding (preferably, wave winding). Each of the phases of the wave winding structure is formed by bending the flat wire 30 and then accommodating the wire in the slot 14 or 15 of an open-slot structure of the stator core 12. As a matter of course, a divided-stator-core structure may be used alternative to the open-slot structure.

The insulating-coating flat wire 30 is formed by coating a copper wire having a substantially rectangular cross section perpendicular to the longitudinal direction, with an enamel layer made such as of polyamide-imide, and further coating its outer surface with an extrusion-coating resin layer made such as of PPS. The total thickness of the insulating-coating is set to 100 μm to 170 μm. However, the insulating-coating structure of the flat wire 30 may be provided using other known processes.

In the present embodiment, a plurality of insulating-coating flat wires 30 are arranged depthwise in each slot, being aligned. However, not limited to this, the flat wires may be arranged in a matrix. Also, insulating paper, which is typically provided at an inner surface of each slot, is omitted from the present embodiment because two-layered insulating layer is formed in the present embodiment. To explain more about the stator coil 20, the flat wire 30 forming the stator coil 20 has slot-held conductor sections 40 which are held in the slots 14, 15 of the stator core 12, and coil-end conductor sections 42 which are each extended in the axial and circumferential directions, while connecting 26 the ends of two slot-held conductor sections 40 apart from each other by substantially one circumferential polar pitch, across both axial ends of the stator core 12.

Figure 3:
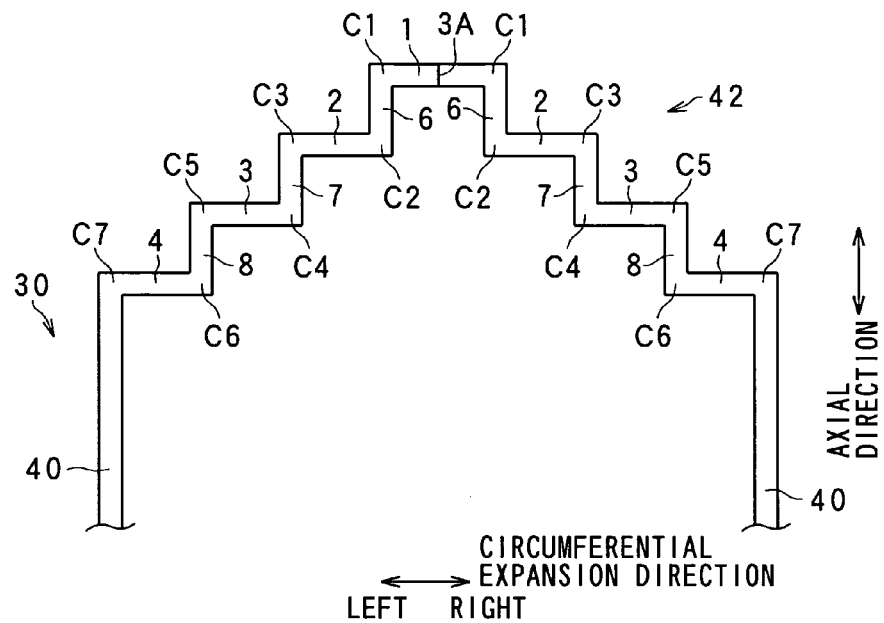
FIG. 3 is an enlarged circumferentially development view of the stepped coil-end conductor section illustrated in FIG. 1.

Referring to FIG. 31 more detailed explanation will be provided about the coil-end conductor sections 42 of the flat wire 30. FIG. 3 so illustrates a schematic circumferential development view of the flat wire 30.

Each coil-end conductor section 42 has a circumferential center portion, or a crown 1, that is a circumferential wire portion positioned axially outermost side and extending along the circumference. The coil-end conductor section 42 is bent in a step-like manner from the crown (circumferential wire section) 1 toward the slot-held conductor sections 40 on the lateral side. The crown (circumferential wire section) 1 has a center portion which is provided with a step (also referred as a "thicknesswise step") 3A in the radial direction (in the direction of the thickness), which substantially corresponds to the thickness of the flat wire 30. The thicknesswise step 3A is provided by radially offsetting circumferentially one half of the coil-end conductor section 42 from the other half thereof by an amount corresponding to the thickness of one conducting wire, so that the coil-end conductor sections 42 can be put one on the other.

Figure 4:
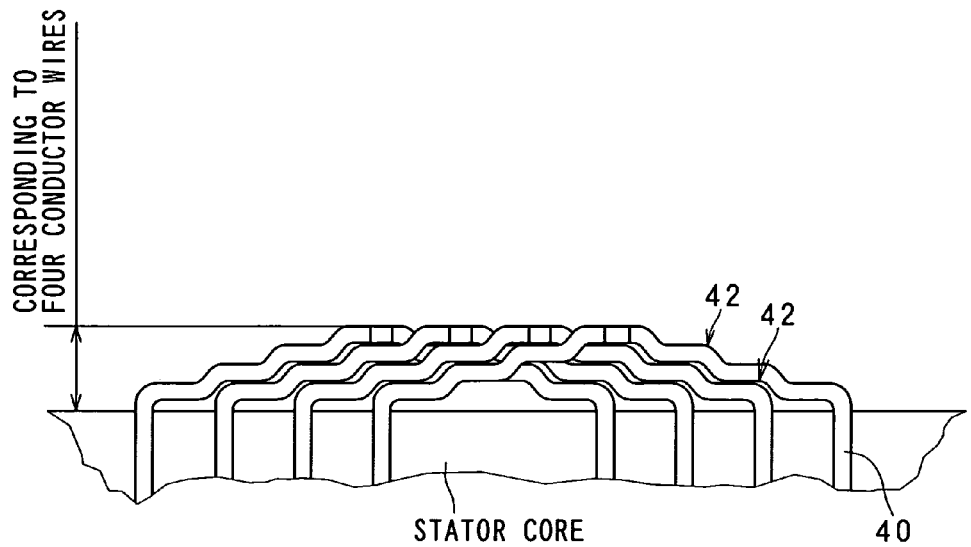
FIG. 4 is a partial circumferential development view of the cranked coil end illustrated in FIG. 2.

FIG. 3 illustrates circumferential wire sections 2-4 extending in the circumferential direction, and axial wire sections 6-8 extending in the axial direction. FIG. 3 also illustrates corner portions C1-C6 each made between adjacently located one circumferential wire section and one axial wire section to form a border portion, and corner portions 7C each made between the circumferential wire section 4 and the slot-held conductor section 40 to form a border portion. Each coil-end conductor section 42 has a stepped form starting from the crown 1 on the axially outermost side toward the lateral slot-held conductor sections 40. In FIG. 3, the corner portions C1-C7 are illustrated as being orthogonal. Actually, however, the corner portions may be curved or bent with a predetermined curvature radius, within a range just enabling high-density mounting of the coil-end conductor section 42 on another coil-end conductor section 42. Thus, as shown in FIG. 4, the assemblage of the coil-end conductor sections 42 can form the cranked coil end of the stator coil.

As described above, in the present embodiment, a long coil conductor, i.e. the flat wire 30, is used to form the coil-end conductor sections 42 at a predetermined longitudinal pitch to thereby form a phase coil that is a circumferentially deploying type of wave winding coil. Then, the coil-end conductor sections 42 of the phase coil having individual phases are highly densely assembled to manufacture a belt-like circumferentially deploying type of stator coil. Then, this stator coil is sequentially inserted into each of the slots of the stator core to complete a stator.

In the stator coil of the present embodiment, the axially projected length is reduced to the utmost limit, which in turn may raise difficulty in forming the cranked coil end in the manufacture. In this regard, the step of bending each flat wire 30, i.e. each coil conductor, into the coil-end conductor section 42 and the step of assembling the coil-end conductor sections 42, are taken in the state where each of the coil conductors is circumferentially deployed before being wound about the stator core. This order of steps can provide an advantage of facilitating the manufacture of stator coils.

Specifically, the stator coil of the present embodiment is fabricated through three sequential steps including: a step of bending the flat wire 30, i.e. the coil conductor, to alternately provide the coil-end conductor sections and the slot-held conductor sections; a step of assembling the bent insulating-coating flat wires 30, i.e. the coil ends, to make a circumferentially deploying type of stator coil; and a step of inserting the stator coil into the slots of the stator coil. The present embodiment is intended to improve the step of bending the coil conductor for providing coil ends.

Referring to FIGS. 5 to 8, hereinafter is specifically described the first embodiment for the steps of bending a coil conductor, that is, steps of bending the flat wire 30, i.e. a coil conductor, to alternately provide the coil-end conductor sections and the slot-held conductor sections.

Figure 5:
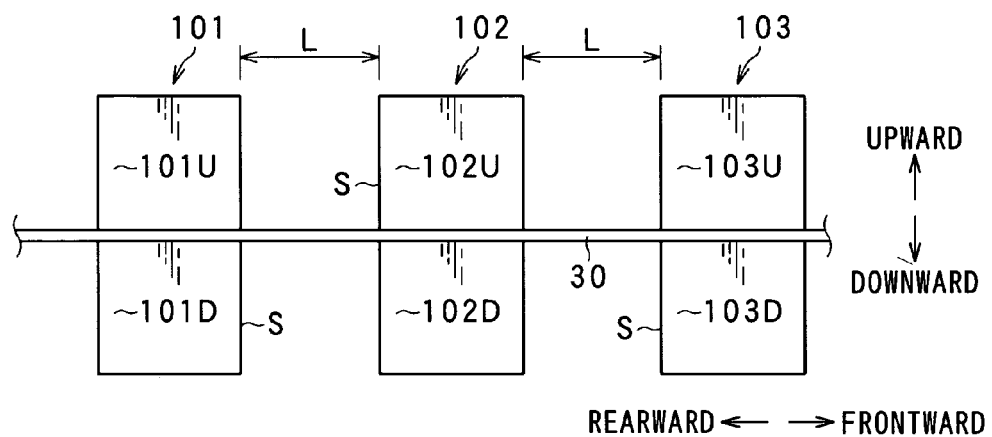
FIG. 5 is a schematic front elevational view illustrating a step of forming a coil-end conductor section in a coil bending process, according to the first embodiment of the present invention.

Referring to FIG. 5, a mold apparatus to be used is explained.

FIG. 5 shows a first pair of molds joy (hereinafter referred to as "mold pair 101"), a second pair of molds 102 (hereinafter referred to as "mold pair 102") and a third pair of molds 103 (hereinafter referred to as "mold pair 103"). The mold pair 101 includes an upper mold 101U and a lower mold 101D which are vertically located clamping the flat wire 30. The mold pair 102 includes an upper mold 102U and a lower mold 102D which are vertically located clamping the flat wire 30. The mold pair 103 includes an upper mold 103U and a lower mold 103D which are vertically located clamping the flat wire 30. Although the upper and lower molds of the present embodiment are vertically located clamping the flat wire 30, these molds may be horizontally located clamping the flat wire 30.

The mold pairs 101 and 102 are located in the front-back direction (the longitudinal direction of the coil conductor) being distanced from each other by an initial length L substantially equal to the length of the slot-held conductor sections 40. Also, the mold pairs 102 and 103 are located in the front-back direction (the longitudinal direction of the coil conductor) being distanced from each other by the length substantially equal to the initial length L of the slot-held conductor section 40.

The upper and lower molds 101U and 101D of the mold pair 101 are movable in the direction of clamping or distancing from the flat wire 30 (vertical direction in the present embodiment), and are also movable in the longitudinal direction of the flat wire 30. Similarly, the upper and lower molds 103U and 103D of the mold pair 103 are movable in the direction of clamping or distancing from the flat wire 30 (vertical direction in the present embodiment), and are also movable in the longitudinal direction of the flat wire 30. In other words, the mold pairs 101 and 103 serve as clamp movement type molds which are able to clamp and move the flat wire 30.

The upper and lower molds 102U and 102D of the mold pair 102 are configured to vertically press a preplanned coil end section of the flat wire 30 to mold the preplanned coil end section into a predetermined shape to thereby form the coil-end conductor section 42. At the same time, the upper and lower molds 102U and 102D are configured to lift down the molded coil-end conductor section 42 by a predetermined length (by the length corresponding to that of the slot-held conductor section 40). In other words, the mold pair 102 serves as mold movement type molds which can mold the flat wire 30 into the coil-end conductor section 42, and can concurrently permit the coil-end conductor section 42 to move. The structure and control of an actuator for moving these molds are well known, and thus the explanation is omitted.

To simplify the structure of the mold actuation structure in the present embodiment, the upper mold 101U of the mold pair 101 is ensured to be actuated in the vertical direction and the front-back direction (the longitudinal direction of the coil conductor) and the lower mold 101D of the mold pair 101 is ensured to be actuated only in the front-back direction.

Hereinafter is described an example of the steps of bending the coil conductor using the mold pairs 101-103. However, the operation of the molds described below is only an example and is not to deny various modifications that would be easily conceived by those who are skilled in the art.

First, referring to FIG. 5, a step of clamp-molding is explained. It should be appreciated that the top surfaces of the lower molds 101D, 102D and 103D are set so as to position at the same level.

First, the upper molds 101U, 102U and 103U are pressed down. In this regard, the under surface of the upper mold 102U, and the top surface of the lower mold 102D each have a shape that matches the shape of the stepped coil-end conductor section 42 shown in FIG. 1. In addition, side surfaces S of the upper molds 101U, 102U and 103U and the lower molds to 101D, 101D and 103D, which face the flat wire 30, are formed to be flat for the slot-held conductor sections 40.

Thus, the mold pair 102 can form the stepped coil-end conductor section 42 in the flat wire 30. The coil-end conductor section 42 may preferably have a stepped shape as mentioned above. As a matter of course, however, the shape of the coil-end conductor section 42 is not limited to the stepped shape, but may be varied by changing the shape of the under surface of the upper mold 102U, and changing the shape of the top surface of the lower mold 102D. Since the upper and lower molds 101U and 101D and 103U and 103D structuring the mold pair 101 only has to clamp the flat wire 30, it is not necessary to form the upper and lower molds 101U and 101D and 103U and 103D into the shape of the coil-end conductor section 42.

Figure 6:
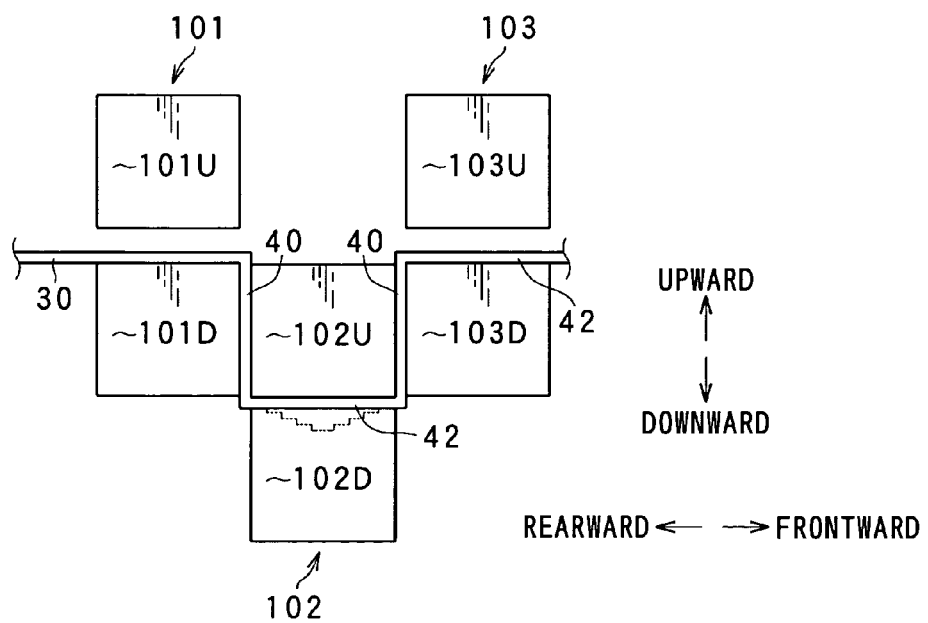
FIG. 6 is a schematic front elevational view illustrating a step of forming a slot-held conductor section in the coil bending process, according to the first embodiment.

As shown in FIG. 6, while the mold pair 101 is moved forward and the mold pair 103 is moved rearward, the mold pair 102 is pressed down. As a result, the slot-held conductor section 40 is formed substantially perpendicular to the coil-end conductor section 42.

Figure 7:
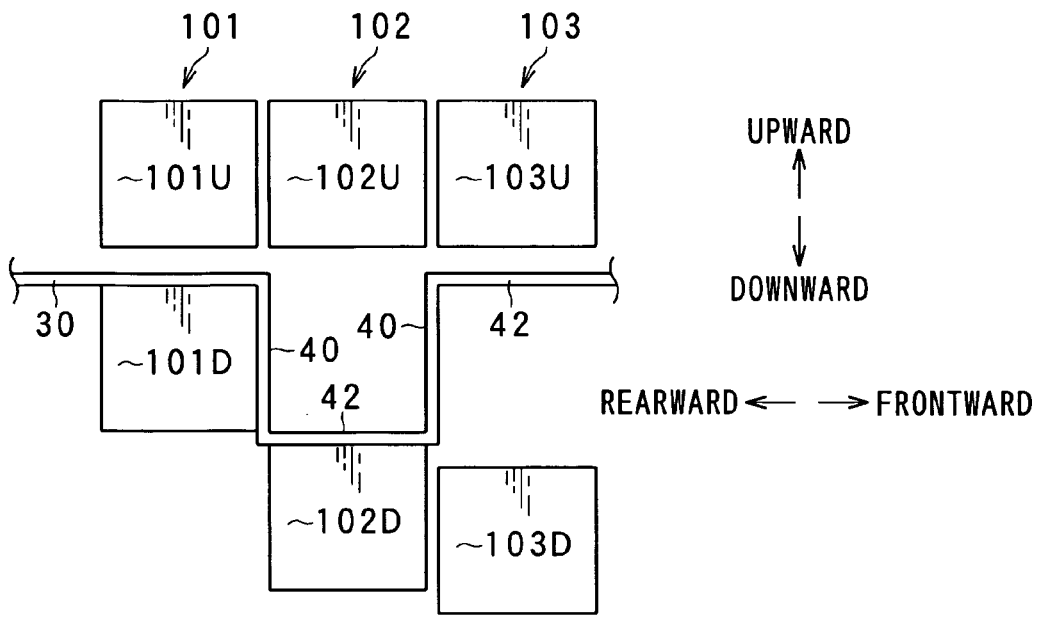
FIG. 7 is a schematic front elevational view illustrating a step of separating the coil from a mold in the coil bending process, according to the first embodiment.

As shown in FIG. 7, the upper molds 101U and 103U are slightly lifted up, and the upper mold 102U is greatly lifted up. Also, the lower mold 103D is greatly pressed down. As a result, the bent flat wire 30 can be ready for the forward movement.

Figure 8:
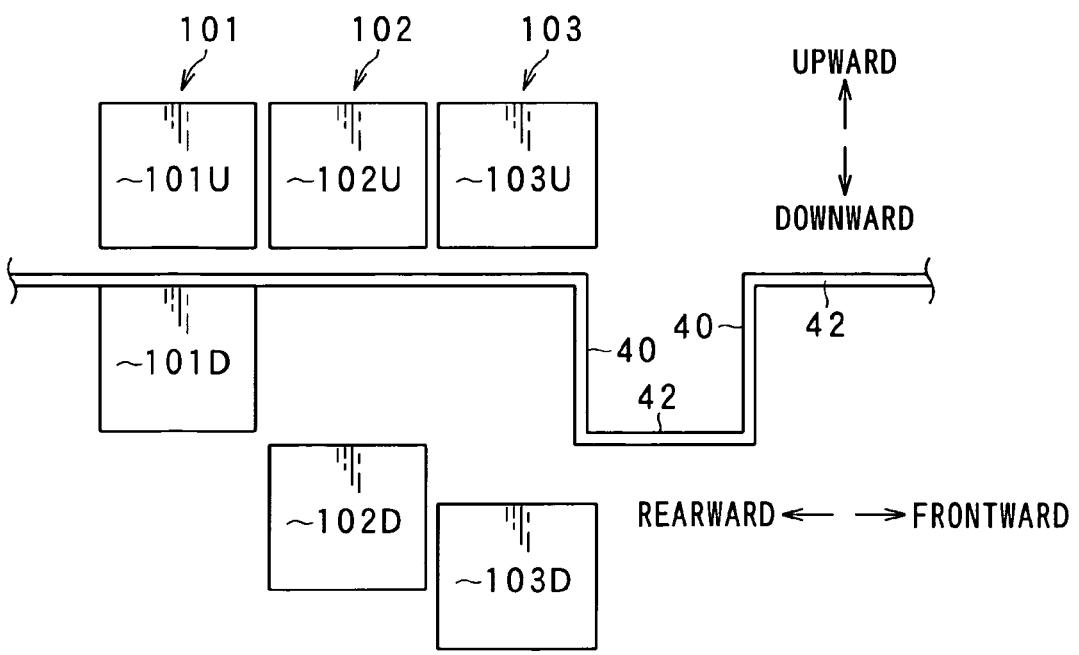
FIG. 8 is a schematic front elevational view illustrating a step of moving forward an insulating-coating flat wire in the coil bending process, according to the first embodiment.

Then, as shown in FIG. 8, the bent flat wire 30 is moved forward. After that, the lower molds 102D and 103D are lifted up to the initial position shown in FIG. 5 to repeat the formation of the coil-end conductor sections 42. Hence the slot-held conductor section 40 and the coil-end conductor sections 42 are formed alternately.

In the above embodiment, the mold pairs 101-103 have been vertically located clamping the flat wire 30. Alternative to this, the mold pairs 101-103 may be horizontally located clamping the flat wire 30. In this case, it is preferable that the flat wire 30 can slidably move forward on a flat guide surface of a base.

Second Embodiment

Figure 9A:
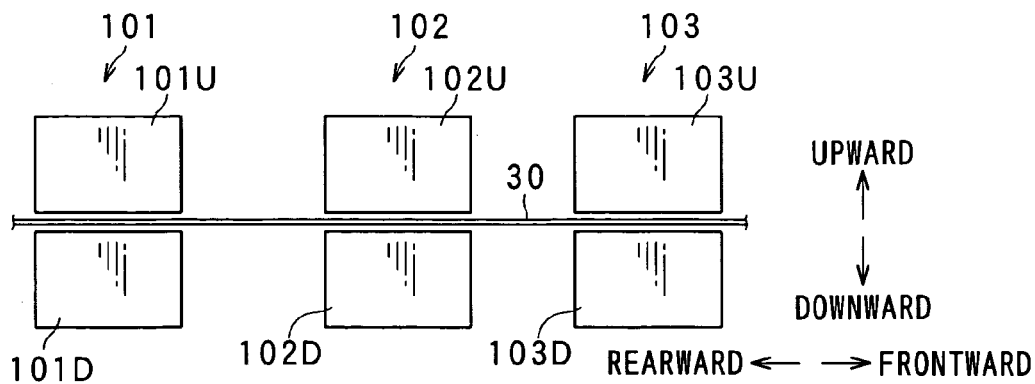
FIG. 9A is a schematic front elevational view illustrating a step of forming a coil-end conductor section in a coil bending process, according to a second embodiment of the present invention.
Figure 9B:
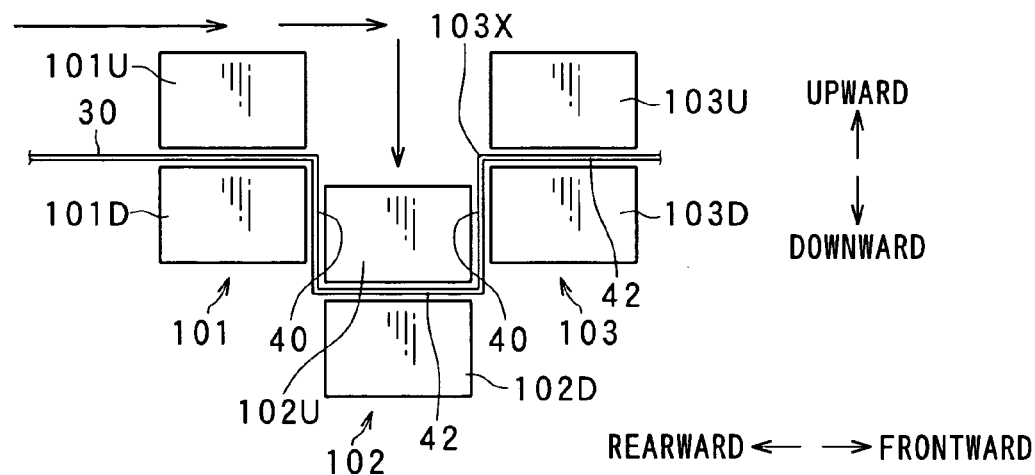
FIG. 9B is a schematic front elevational view illustrating a step of forming a slot-held conductor section in the coil bending process, according to the second embodiment.
Figure 9C:
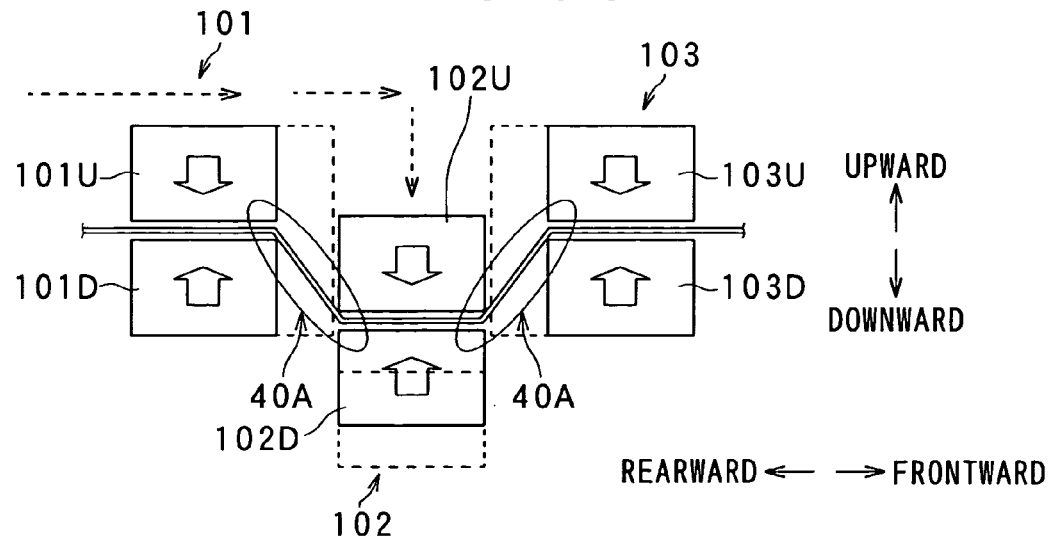
FIG. 9C is a schematic front elevational view illustrating, a synchronous relationship between lift-up movement and forward movement of a mold pair, according to the second embodiment.

Referring now to FIGS. 9A to 9C, hereinafter is described a second embodiment for the steps of bending a coil conductor. In the present and the subsequent embodiments, the identical or similar components to those in the first embodiment described above are given the same reference numerals for the sake of omitting explanation.

In the steps of the second embodiment, the flat wire 30, i.e. the coil conductor, is bent so that the coil-end conductor sections and the slot-held conductor sections are alternated.

Referring to FIG. 5, a mold apparatus to be used is explained. The structure of the mold apparatus is the same as that of the first embodiment, but the operation is different from that of the first embodiment. Therefore, the description provided below is focused on the operation of the molds.

Molding of the coil-end conductor section 42 shown in FIG. 9A is carried out in the same manner as in the first embodiment shown in FIG. 5. Specifically, the top surfaces of the lower molds 101D, 102D and 103D are set so as to be positioned at the same level. The upper molds 101U, 102U and 103U are pushed down. Thus, the coil-end conductor section 42 is formed by the mold pairs 102 and 103.

Subsequently, as shown in FIG. 9B, the mold pair 102 is pressed down while being moved forward. As a result, the flat wire 30 is bent in such a way that the portion thereof between the coil-end conductor section 42 in the mold pair 103 and the coil-end conductor section 42 in the mold pair 102 becomes perpendicular to the coil-end conductor portions 42 to serve as the slot-held conductor section 40. Concurrently with the downward and forward movements of the mold pair 102, the mold pair 101 is moved forward. As a result, the flat wire 30 is bent in such a way that the portion thereof between the coil-end conductor section 42 in the mold pair 101 and the coil-end conductor section 42 in the mold pair 102 becomes perpendicular to the coil-end conductor portions 42 to serve as the slot-held conductor section 40.

An important point in the bending mold of the slot-held portion 40 is that the longitudinal force and the perpendicularly bending force should be ensured not to act on the preplanned slot-held conductor section 40A, which will eventually serve as the slot-held conductor section 40 after being perpendicularly bent, in the course of the forward and downward movement of the mold pair 102 and the forward movement of the mold pair 101.

To this end, the length of the preplanned slot-held conductor section 40A should be kept at a constant length. In particular, as shown in FIG. 9C, the forward and downward movements of the mold pair 102 and the forward movement of the mold pair 101 may be synchronously controlled, so that the distance between a rear end 103X of the mold pair 103 and a front end 102Y of the mold pair 102 can be ensured to be equal to the distance between a rear end 102X of the mold pair 102 and a front end 101Y of the mold pair 101. The same applies to the downward movement of the mold pair 102, the forward movement of the mold pair 101 and the rearward movement of the mold pair 103 in the first embodiment.

Then, as shown in FIG. 7, the upper molds 101U and 103U are slightly lifted up, and the upper mold 102U is greatly lifted up. Also, the lower mold 103D is greatly pressed down. As a result, the bent flat wire 30 can be ready for the forward movement.

Then, as shown in FIG. 8, the bent flat wire 30 is moved forward. The length of the forward movement may correspond to an electrical angle 2π. After that, the lower molds 102D and 103D are lifted up to the position shown in FIG. 5 to repeat the formation of the coil-end conductor sections 42 as described above.

The mold pairs 101-103 may be horizontally located to clamp the flat wire 30. In this case, it is preferable that the flat wire 30 can slidably move forward on a flat guide surface of a base.

Third Embodiment

Referring now to FIGS. 10A to 11B, hereinafter is described a third embodiment for the steps of bending a coil conductor.

In the steps of the third embodiment, the flat wire 30, i.e. the coil conductor, is bent so that the coil-end conductor sections and the slot-held conductor sections are alternated.

In the coil conductor bending steps explained in the second embodiment with reference to FIGS. 9A to 9C, the present embodiment enables adjustment of an interval L between the mold pairs 101, 102 and 103 shown in FIG. 9A and adjustment of a descending length D of the mold pair 102 shown in FIG. 9B, depending on the type of motors. The interval L is substantially equal to the descending length D, but correctly, the interval L is set to be larger than the length D by an amount corresponding to the thickness of the flat wire 30.

Figure 10A:
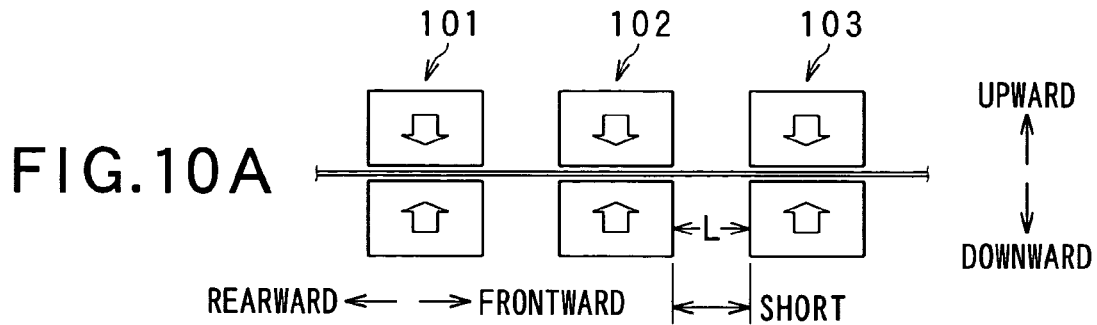
FIG. 10A is a schematic front elevational view illustrating a longitudinal arrangement of a mold pair in the case where a slot-held conductor section is short, according to a third embodiment of the present invention.
Figure 10B:
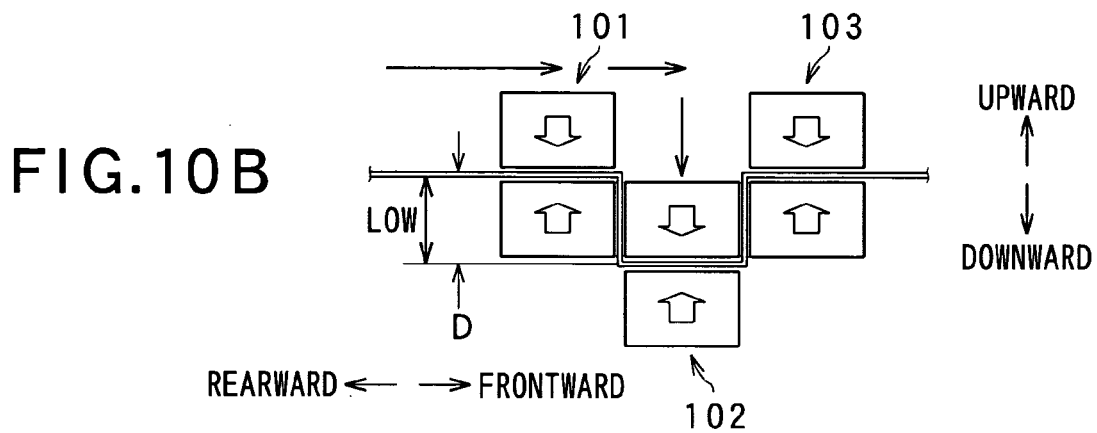
FIG. 10B is a schematic front elevational view illustrating lift-down movement of the mold pair in the case where the slot held conductor section is short, according to the third embodiment.
Figure 11A:
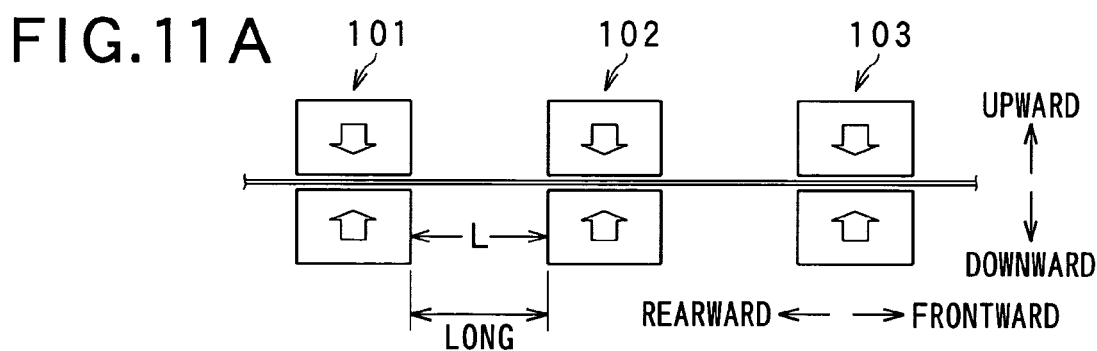
FIG. 11A is a schematic front elevational view illustrating a longitudinal arrangement of the mold pair in the case where a slot-held conductor section is long, according to the third embodiment.
Figure 11B:
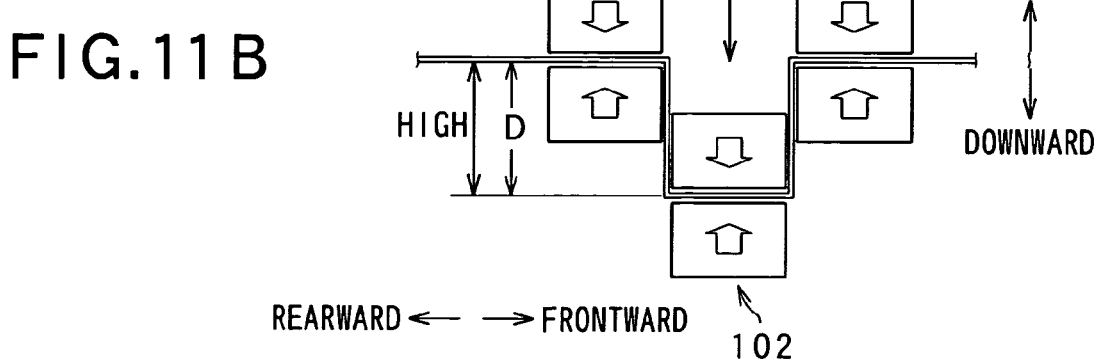
FIG. 11B is a schematic front elevational view illustrating lift-down movement of the mold pair in the case where the slot-held conductor section is long, according to the third embodiment.

To explain more in detail, in fabricating a stator coil for a motor whose axial length of the stator core is small, the interval L and the descending length D are decreased, as shown in FIGS. 10A and 10S, in conformity with the axial length of the stator core. On the contrary, in fabricating a stator coil for a motor whose axial length of the stator core is large, the interval L and the descending length D are increased, as shown in FIGS. 11A and 11S, in conformity with the axial length of the stator core.

In this way, stator coils for a plurality of motors having stator cores of different axial lengths can be manufactured using a single coil conductor bending apparatus. It is apparent that, in the first embodiment as well, stator coils for a plurality of motors having stator cores of different axial lengths can be manufactured in the similar manner, using a single coil conductor bending apparatus.

Fourth Embodiment

Referring now to FIG. 12, hereinafter is described a fourth embodiment for the steps of bending a coil conductor.

In the steps of the fourth embodiment, the flat wire 30, i.e., the coil conductor, is bent so that the coil-end conductor sections and the slot-held conductor sections are alternated.

The present embodiment has a feature that three types of mold sets, each consisting of the three mold pairs 101-103, are provided in such a way that they can be automatically changeable.

FIG. 12 illustrates a first mold set 201, a second mold set 202 and a third mold set 203. Each of the mold sets has the lower molds 101D, 102D and 103D and the upper molds 101U, 102U and 103U. The mold sets 201-203 have different widths in the longitudinal direction (i.e. horizontal front-back direction) of the flat wire 30.

In this way, by only simultaneously changing the mold sets 201-203 each having the three mold pairs, the length corresponding to the electrical angle n of the stator coil can be changed. Accordingly, stator coils with different diameters can be obtained through the bending mold using a single apparatus, by changing the mold sets.

Figure 13:
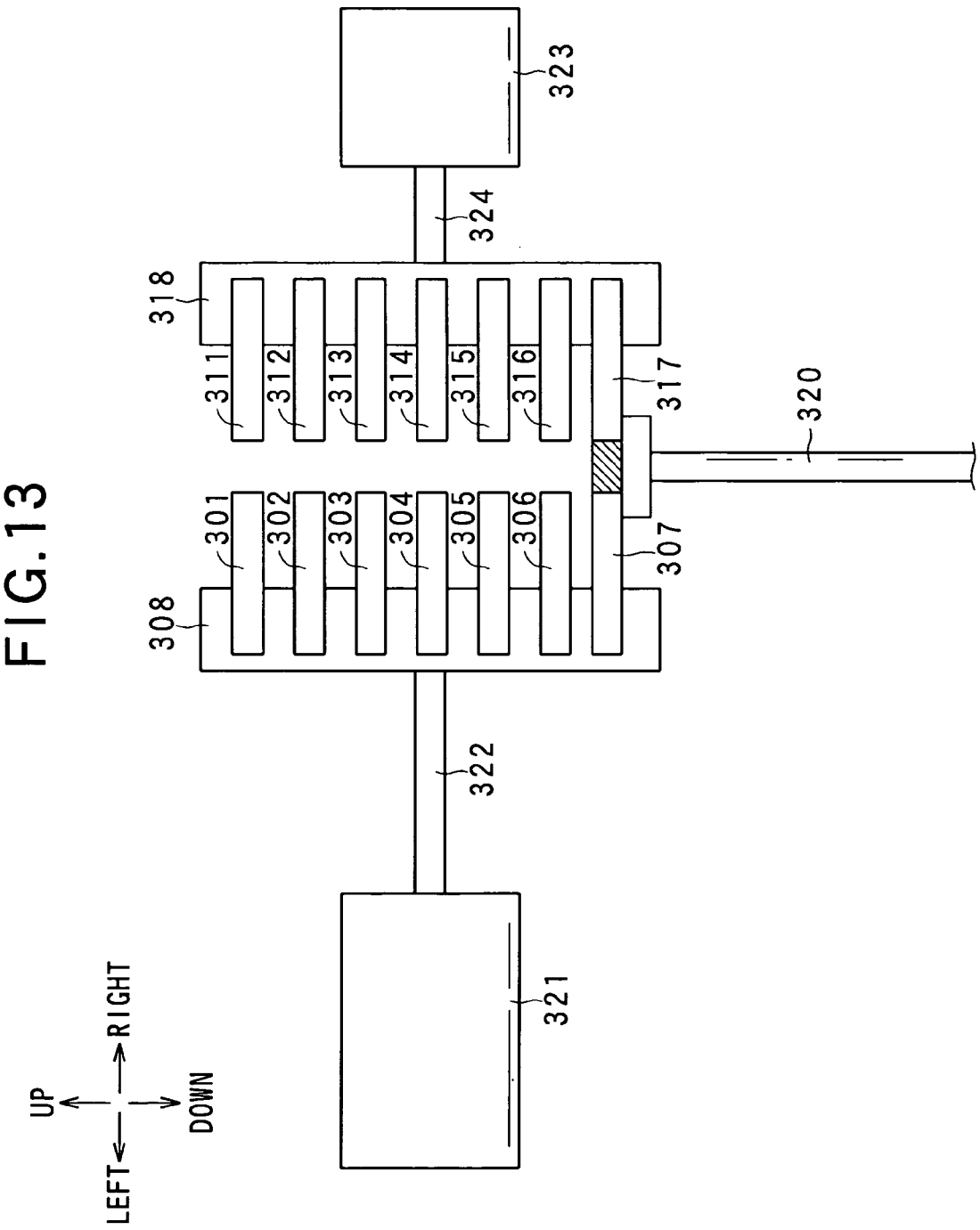
FIG. 13 is a side elevational view illustrating a coil bending apparatus having a function of automatically changing mold pairs, according to the fourth embodiment.

Referring to FIG. 13, hereinafter is described an example of a coil bending apparatus in which the mold sets to be used are changeable.

In the coil bending apparatus shown in FIG. 13, the upper molds and the lower molds configuring the respective mold pairs described above are horizontally located here sandwiching the flat wire 30 with a predetermined horizontal interval therebetween. However, the coil-bending operation is the same as that of each of the first and second embodiments, and thus the explanation is omitted.

Specifically, a total of seven molds 304-307 on the left side are vertically located with a predetermined interval therebetween, and a total of seven molds 311-317 on the right side are vertically located with a predetermined interval therebetween. The molds 301, 311 forming a first mold pair are located at the same level. The molds 301, 312 forming a second mold pair are located at the same level. The molds 303, 313 forming a third mold pair are located at the same level. The molds 304, 314 forming a fourth mold pair are located at the same level. The molds 305, 315 forming a fifth mold pair are located at the same level. The molds 306, 316 forming a sixth mold pair are located at the same level. The molds 307, 317 forming a seventh mold pair are located at the same level.

The left-side molds 301-307 are supported by a mold holder 308 so as to be slidable in the horizontal direction. The right-side molds 311-317 are supported by a mold holder 318 so as to be slidable in the horizontal direction. The mold holders 308, 318 are fixed to a frame, not shown, being vertical moveable. It should be appreciated that FIG. 13 is a side elevation of the coil bending apparatus as viewed from the rear side to which the flat wire 30 is extended. The left-side molds 301-307 have different widths along the longitudinal direction of the flat wire 30. The right-side molds 311-317 also have different widths along the longitudinal direction of the flat wire 30. In other words, each of the seven mold pairs corresponds to the first mold pair 101 shown in FIG. 9A. Therefore, selection of one of the seven mold pairs enables change in the circumferential width of the coil-end conductor section 42, as in the case of changing mold pairs in FIG. 12.

A mold pair is selected by lifting up the mold holders 308, 818 and bringing the mold pair to be selected to the same level as the flat wire 30. The mold holders 308, 318 are lifted up using an oil-hydraulic cylinder, not shown. As a matter of course, the mold holders 308, 318 may be fixed and the flat wire 30 may be lifted up.

An oil-hydraulic cylinder 321 is disposed on the left side, i.e. the back surface side, of the mold holder 308, with an end of a rod 322 of the cylinder 321 being fixed to the back surface of the mold holder 308. Similarly, an oil-hydraulic cylinder 323 is disposed on the right side, i.e. the back surface side, of the mold holder 318, with an end of a rod 324 of the cylinder 323 being fixed to the back surface of the mold holder 318. The oil-hydraulic cylinders 321, 323 are lifted up with the mold holders 308, 318, respectively, in an integral manner. In this way, with the control of the cylinders 321, 323, the mold pairs on the lateral sides of the flat wire 30 can be horizontally moved by a length required for the bending steps described above, through the respective mold holders 308, 318.

The description provided above is associated with a control for the first mold set consisting of a total of seven mold pairs, each of which corresponds to the first mold pair 101 shown in FIG. 9A. A second mold set consisting of a total of seven mold pairs, each of which corresponds to the second mold pair 102 shown in FIG. 9A, is located on the back side as viewed from FIG. 13, i.e. on the front side of the flat wire 30. The control of the second mold set is performed similarly, synchronizing with the first mold set. Further, a third mold set consisting of a total of seven mold pairs, each of which corresponds to the third mold pair 103 shown in FIG. 9A, is located on the further back side as viewed from FIG. 13, i.e. on the further front side of the flat wire 30. The control of the third mold set is performed similarly, synchronizing with the first mold set.

In this way, the circumferential width of the coil-end conductor section 42 can be adjusted in seven variations. For example, in the case where seven slot-held conductor sections 40 are to be radially held in one slot, the coil-end conductor sections 42 continuing from the seven respective slot-held conductor sections 40 may have different circumferential widths. Accordingly, use of this coil bending apparatus enables manufacture of a stator coil in which seven slot-held conductor sections 40 can be radially held in one slot.

The above first and second embodiments have used the three mold pairs 101-103. Alternatively, however, more number of mold pairs may be located in the similar manner in the circumferential direction of the flat wire 30.

The above embodiments have used, as a coil conductor, the flat wire 30 having a substantially rectangular cross section perpendicular to the longitudinal direction. However, the shape of a cross section may be optional.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A method of manufacturing a stator coil to be wound in and around a stator by bending an insulating-coating conducting wire having a longitudinal direction along which the wire extends linearly, wherein the insulating-coating conducting wire is bent so as to alternately have slot-held conductor sections to be held in slots of the stator and coil-end conductor sections each mutually connecting two of the slot-held conductor sections outside the slots, the stator having a circumferential direction along which the coil-end conductor sections are deployed and an axial direction along which the slots extend, the method comprising:

arranging three or more pairs of molds along the insulating-coating conducting wire in the longitudinal direction at predetermined intervals such that the three or more pairs of molds are located along a portion of the insulating-coating conducting wire, the portion of the insulating-coating conducting wire being placed linearly and serving as a wire section which is to be formed into each of the coil-end conductor sections, each pair of molds having paired molds facing with each other with the portion of the insulating-coating conducting wire located between the paired molds;

first forming the coil-end conductor sections by moving the mold pairs of the three or more pairs of molds such that the paired molds come closer to each other; and second forming the slot-held conductor sections by moving the three or more pairs of molds, in parallel, in both the longitudinal direction along which the portion of the insulating-coating conducting wire extends and a direction perpendicular to the longitudinal direction, wherein the arranging step arranges the three or more pairs of molds including a pair of molds selected from a plurality of pairs of molds respectively having different widths in the longitudinal direction, the different widths allowing the coil-end conductor section to have a changed width in a circumferential direction of the stator.

2. The method of claim 1, wherein the second forming step moves the three or more pairs of molds, in parallel, in both the longitudinal direction and the direction perpendicular to the longitudinal direction in a condition where, when forming the coil-end conduction section, mutually adjacent pairs of molds among the three or more pairs of molds are kept apart by a distance that corresponds to a length of the slot-held conductor sections in the axial direction, the distance corresponding to the intervals.

3. The method of claim 1, wherein
the plurality of pairs of molds respectively having the different widths, from which the pair of molds is selected, are arranged in the direction perpendicular to the longitudinal direction of the insulating-coating conducting wire and, in the arranging step, the pair of molds is selected by moving, relatively to the insulating-coating conducting wire, the plurality of pairs of molds in an arranged direction of the plurality of pairs of molds.

4. The method of claim 1, wherein
the three or more pairs of molds are composed of three pairs of molds including a middle pair of molds positioned between the two pairs of molds and
the forming step forms the slot-held conductor sections by making, of the three pairs of molds, specified two pairs of molds move toward the remaining one pair of molds and the middle pair of molds move along the direction perpendicular to the longitudinal direction.

5. The method of claim 4, wherein the middle pair of molds has surfaces to mold the coil-end conductor section and the three pairs of molds have flat side surfaces to mold the slot-held conductor sections.

6. The method of claim 1, wherein the forming step moves the three or more pairs of molds in both the direction perpendicular to the longitudinal direction and the longitudinal direction, respectively, by distances which are adjustable.

7. The method of claim 1, wherein the three or more pairs of molds includes a pair of molds selected from a plurality of pairs of molds respectively having different pressing surfaces to be pressed onto the portion of the insulating-coating conducting wire so as to form coil-end conductor sections having different shapes from each other.

8. The method of claim 1, wherein the forming step uses the three or more pairs of molds including a pair of molds selected from a plurality of pairs of molds respectively having different widths in the longitudinal direction when being arranged along the portion of the insulating-coating conducting wire, whereby the coil-end conductor section is given a changed width in the circumferential direction.

9. The method of claim 8, wherein
the plurality of pairs of molds respectively having the different widths, from which the pair of molds is selected, are arranged in a direction substantially perpendicular to an extending direction of the insulating-coating conducting wire and, in the forming step, the pair of molds is selected by relatively moving the plurality of pairs of molds having the different widths in an arranged direction thereof.

10. The method of claim 4, wherein the forming step moves the three or more pairs of molds, in parallel, in both the direction perpendicular to the longitudinal direction and the longitudinal direction in a condition where, when forming the coil-end conduction section, mutually adjacent pairs of molds among the three or more pairs of molds are kept apart by a distance that corresponds to a length of the slot-held conductor sections in the axial direction, the distance corresponding to the intervals.

11. The method of claim 10, wherein the forming step moves the three or more pairs of molds in both the direction perpendicular to the longitudinal direction and the longitudinal direction, respectively, by distances which are adjustable.

12. The method of claim 11, wherein the three or more pairs of molds includes a pair of molds selected from a plurality of pairs of molds respectively having different pressing surfaces to be pressed onto the portion of the insulating-coating conducting wire so as to form coil-end conductor sections having different shapes from each other.

13. The method of claim 11, wherein the forming step uses the three or more pairs of molds includes a pair of molds selected from a plurality of pairs of molds respectively having different widths in the longitudinal direction when being arranged along the portion of the insulating-coating conducting wire, whereby the coil-end conductor section is given a changed width in the circumferential direction.

* * * * *